United States Patent
Nomura

(10) Patent No.: US 10,361,576 B2
(45) Date of Patent: Jul. 23, 2019

(54) AUTOMOBILE AND CONTROL METHOD FOR AUTOMOBILE

(71) Applicant: Toyota Jidosha Kabushiki Kaisha, Toyota-shi Aichi-ken (JP)

(72) Inventor: Yoshihiro Nomura, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 364 days.

(21) Appl. No.: 15/462,272

(22) Filed: Mar. 17, 2017

(65) Prior Publication Data
US 2017/0274796 A1    Sep. 28, 2017

(30) Foreign Application Priority Data

Mar. 22, 2016    (JP) .................. 2016-057235

(51) Int. Cl.
| | | |
|---|---|---|
| B60L 1/00 | (2006.01) | |
| B60L 3/00 | (2019.01) | |
| H02G 3/00 | (2006.01) | |
| H02J 7/00 | (2006.01) | |
| B60H 1/00 | (2006.01) | |
| B60K 6/22 | (2007.10) | |
| B60H 1/14 | (2006.01) | |
| B60L 53/14 | (2019.01) | |
| B60L 58/12 | (2019.01) | |

(52) U.S. Cl.
CPC ........ *H02J 7/0068* (2013.01); *B60H 1/00278* (2013.01); *B60H 1/00385* (2013.01); *B60H 1/00642* (2013.01); *B60H 1/143* (2013.01); *B60K 6/22* (2013.01); *B60L 53/14* (2019.02); *B60L 58/12* (2019.02); *H02J 7/0088* (2013.01); *B60Y 2200/91* (2013.01); *B60Y 2200/92* (2013.01); *B60Y 2300/91* (2013.01); *Y10S 903/904* (2013.01)

(58) Field of Classification Search
CPC ............ B60H 1/00278; B60H 1/00385; B60H 1/00642; B60H 1/143; B60K 6/22; B60L 53/14; B60L 58/12; H02J 7/0068; H02J 7/0088; B60Y 2200/91; B60Y 2200/92; B60Y 2300/91; Y10S 903/904
USPC ....................................................... 307/10.1
See application file for complete search history.

(56) References Cited

U.S. PATENT DOCUMENTS

| | | | |
|---|---|---|---|
| 5,562,538 A | 10/1996 | Suyama | |
| 2013/0268158 A1* | 10/2013 | Kurita | .............. B60L 3/00 701/32.8 |
| 2014/0097676 A1* | 4/2014 | Kusumi | .............. H02J 7/045 307/10.1 |

FOREIGN PATENT DOCUMENTS

| | | |
|---|---|---|
| JP | 2006-006039 A | 1/2006 |
| JP | 2011-199920 A | 10/2011 |

* cited by examiner

*Primary Examiner* — Rexford N Barnie
*Assistant Examiner* — Toan T Vu
(74) *Attorney, Agent, or Firm* — Dinsmore & Shohl LLP

(57) ABSTRACT

An electronic control unit is configured to i) turn off a charging relay when a charger is disconnected from an external power source while external charging is in progress which is started when the charger is connected to the external power source and the charging relay is turned on while a system is off and in which a battery is charged with electric power from the external power source by the charger, and ii) set the period from the disconnection of the charger from the external power source to the turn-off of the charging relay to be longer when preliminary air conditioning is in progress than when preliminary air conditioning is not in progress.

3 Claims, 4 Drawing Sheets

AUTOMOBILE AND CONTROL METHOD FOR AUTOMOBILE

CROSS-REFERENCE TO RELATED APPLICATIONS

This application claims priority to Japanese Patent Application No. 2016-057235 filed on Mar. 22, 2016 which is incorporated herein by reference in its entirety including the specification, drawings and abstract.

BACKGROUND

1. Technical Field

The present disclosure relates to an automobile, and, more particularly, to an automobile that is equipped with a motor, a battery, an air conditioner, a charger and a charging relay and a method for controlling the automobile.

2. Description of Related Art

As an automobile of this kind, an automobile has been proposed in which a charger is connected to a motor, a battery and an air conditioner via a charging relay and the charging relay is turned on to carry out external charging in which the battery is charged with electric power from an external power source by the charger when the charger is connected to the external power source while the system is off (refer to Japanese Patent Application Publication No. 2011-199920 (JP 2011-199920 A), for example. In this automobile, when there is a request to turn on the air conditioner while external charging is in progress, preliminary air conditioning in which the air conditioner is operated on electric power from the external power source is carried out.

SUMMARY

In such an automobile, when the charger is disconnected from the external power source while external charging is in progress, the charging relay is turned off. When the charger is disconnected from the external power source while external charging and preliminary air conditioning are in progress, it is highly likely that the charger will be reconnected to the external power source within a relatively short period of time afterward. However, when the charging relay is turned off before the reconnection of the charger to the external power source, it takes time to restart external charging because the charging relay needs to be turned on again to restart external charging when the charger is reconnected to the external power source.

The present disclosure provides an automobile in which it takes a shorter time to restart external charging when the charger is reconnected to the external power source after it is disconnected from the external power source while external charging and preliminary air conditioning are in progress, and also provides a method for controlling the automobile.

An automobile according to a first aspect of the present disclosure includes a motor configured to drive the automobile; a battery that is connected to the motor via a power line; an air conditioner that is connected to the power line and is configured to air-condition a cabin; a charger that is connected to the power line and is capable of charging the battery with electric power from an external power source when the charger is connected to the external power source; a charging relay that is provided on the power line and is configured to connect and disconnect the motor, the battery and the air conditioner to and from the charger when the charging relay is turned on and off; and an electronic control unit. The electronic control unit is configured to i) turn off the charging relay when the charger is disconnected from the external power source while external charging is in progress which is started when the charger is connected to the external power source and the charging relay is turned on while a system is off and in which the battery is charged with electric power from the external power source by the charger, and ii) set a period from the disconnection of the charger from the external power source to a turn-off of the charging relay to be longer when preliminary air conditioning is in progress than when preliminary air conditioning is not in progress. The preliminary air conditioning is air conditioning in the cabin that is carried out by the air conditioner while the system is off.

A second aspect of the present disclosure provides a control method for an automobile. The automobile includes a motor configured to drive the automobile; a battery that is connected to the motor via a power line; an air conditioner that is connected to the power line and is configured to air-condition a cabin; a charger that is connected to the power line and is capable of charging the battery with electric power from an external power source when the charger is connected to the external power source; a charging relay that is provided on the power line and is configured to connect and disconnect the motor, the battery and the air conditioner to and from the charger when the charging relay is turned on and off; and an electronic control unit. The control method includes i) turning off the charging relay by the electronic control unit when the charger is disconnected from the external power source while external charging is in progress which is started when the charger is connected to the external power source and the charging relay is turned on while a system is off and in which the battery is charged with electric power from the external power source by the charger, and ii) setting, by the electronic control unit, a period from the disconnection of the charger from the external power source to a turn-off of the charging relay to be longer when preliminary air conditioning is in progress than when preliminary air conditioning is not in progress. The preliminary air conditioning is air conditioning in the cabin that is carried out by the air conditioner while the system is off.

In the automobile according to the first aspect of the present disclosure and the control method for an automobile according to the second aspect, the charging relay is turned off when the charger is disconnected from the external power source while external charging is in progress which is started when the charger is connected to the external power source and the charging relay is turned on while the system is off and in which the battery is charged with electric power from the external power source by the charger. In addition, the period from the disconnection of the charger from the external power source to the turn-off of the charging relay is set to be longer when preliminary air conditioning, which is air conditioning in the cabin that is carried out by the air conditioner while the system is off, is in progress than when preliminary air conditioning is not in progress. This prevents, when the charger is reconnected to the external power source within a relatively short period of time after the charger is disconnected from the external power source while external charging and preliminary air conditioning are in progress, the charging relay from being turned off during that time. As a result, the period from the reconnection of the charger to the external power source to the restart of external charging can be shortened. In addition, because the frequency of turning on and off the charging relay decreases, the charging relay is prevented from suffering from a reduced service life. When the charger is disconnected from the external power source while external charging is in progress but preliminary air conditioning is not, it is highly likely that the automobile will be driven soon afterward. This is the reason why the period from the disconnection of the charger from the external power source to the turn-off of the charging relay is set to be shorter than when preliminary air conditioning is in progress.

In this automobile, the electronic control unit may be configured to turn off the charging relay after stopping driving of the charger when the charger is disconnected from the external power source while the external charging is in progress. With this configuration, it is further ensured that no current is flowing through the charging relay when the charging relay is turned off. This prevents the charging relay from getting stuck in an ON state.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

A mode for carrying out the present disclosure is next described with reference to an embodiment.

Figure 1:
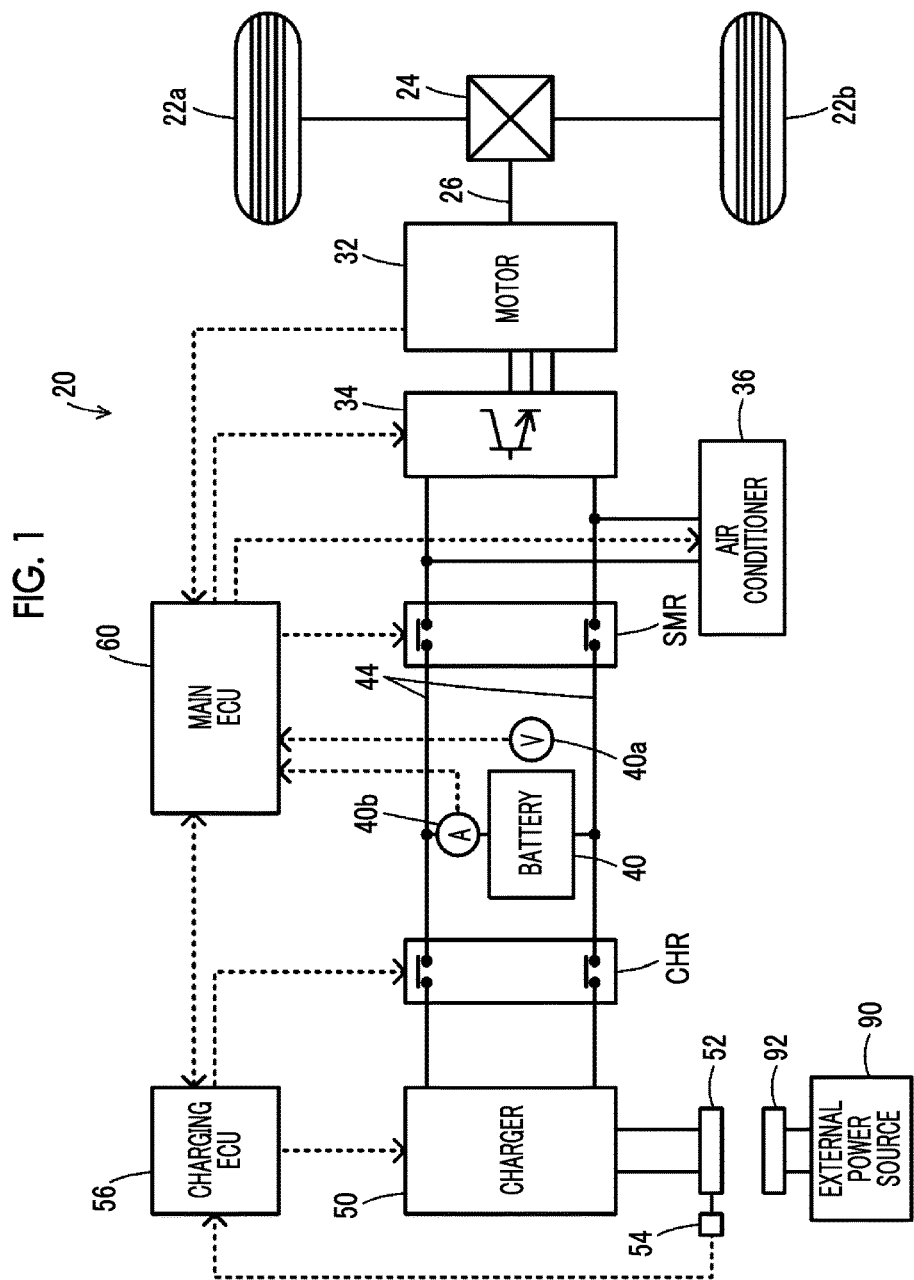
FIG. 1 is a configuration diagram that illustrates the general configuration of an electric vehicle as one embodiment of the present disclosure.

FIG. 1 is a configuration diagram that illustrates the general configuration of an electric vehicle 20 as one embodiment of the present disclosure. As shown in the drawing, the electric vehicle 20 of the embodiment includes a motor 32, an inverter 34, an air conditioner 36, a battery 40, a charger 50, a system main relay SMR, a charging relay CHR, and a main electronic control unit (which is hereinafter referred to as "main ECU") 60.

The motor 32 is constituted as, for example, a synchronous generator-motor, and is connected to a drive shaft 26 that is coupled to driving wheels 22a and 22b via a differential gear 24. The inverter 34, which is used to drive the motor 32, is connected to power lines 44. The main ECU 60 performs switching control of a plurality of switching elements (not shown) of the inverter 34 to rotatably drive the motor 32. The air conditioner 36 is connected to the power lines 44 and air-conditions the cabin under the control of the main ECU 60. The battery 40, which is constituted as, for example, a lithium ion secondary battery or nickel-hydrogen secondary battery, is connected to the inverter 34 via the power lines 44 as described above.

The charger 50 is connected to the power lines 44, and is configured to be capable of charging the battery 40 with electric power from an external power source 90 when its vehicle-side connector 52 is connected to a power source-side connector 92 of the external power source 90. The charger 50 supplies electric power from the external power source 90 to the battery 40 under the control of a charging electronic control unit (which is hereinafter referred to as "charging ECU") 56 when the vehicle-side connector 52 is connected to the power source-side connector 92.

The system main relay SMR is connected across the power lines 44, and is turned on and off under the control of the main ECU 60 to connect and disconnect the inverter 34 and the air conditioner 36 to and from the battery 40.

The charging relay CHR is connected across the power lines 44, and is turned on and off under the control of the charging ECU 56 to connect and disconnect the inverter 34, the air conditioner 36 and the battery 40 to and from the charger 50.

The charging ECU 56 is constituted as a microprocessor that has a CPU (not shown) as the functional center, and includes, in addition to the CPU, a ROM in which processing programs are stored, a RAM in which data are temporarily stored, input and output ports, a communication port and so on. Into the charging ECU 56, signals, such as signals from various sensors that are attached to the charger 50 and a connection signal from a connection switch 54 that is attached to the vehicle-side connector 52 to determine whether the vehicle-side connector 52 is connected to the power source-side connector 92 of the external power source 90, are input via the input port. From the charging ECU 56, signals, such as a control signal to the charger 50 and a control signal to the charging relay CHR, are output via the output port. The charging ECU 56 is connected to the main ECU 60 via the communication port.

The main ECU 60 is constituted as a microprocessor that has a CPU (not shown) as the functional center, and includes, in addition to the CPU, a ROM in which processing programs are stored, a RAM in which data are temporarily stored, input and output ports, a communication port and so on. Into the main ECU 60, signals from various sensors are input via the input port. Examples of the signals that are input into the main ECU 60 include a rotational position of a rotor of the motor 32 from a rotational position sensor that detects the rotational position of the rotor of the motor 32, a voltage Vb from a voltage sensor 40a that is attached between terminals of the battery 40, and a current Ib from a current sensor 40b that is attached to an output terminal of the battery 40. Also included are an ignition signal from an ignition switch, a shift position SP from a shift position sensor, an accelerator pedal operation amount from an accelerator pedal position sensor, a brake pedal position from a brake pedal position sensor, and a vehicle speed from a vehicle speed sensor. From the main ECU 60, various control signals are output via the output port. Examples of the signals that are output from the main ECU 60 include switching control signals to the switching elements of the inverter 34, a control signal to the air conditioner 36, and a control signal to the system main relay SMR. The main ECU 60 is connected to the charging ECU 56 via the communication port. The main ECU 60 calculates the state of charge SOC of the battery 40 based on an integrated value of the current Ib to or from the battery 40 from the current sensor 40b. The main ECU 60 also calculates the product of the voltage Vb of the battery 40 from the voltage sensor 40a and the current Ib to or from the battery 40 from the current sensor 40b as the electric power Pb that is being charged into or discharged from the battery 40.

In the electric vehicle 20 of the embodiment constituted as described above, the charging ECU 56 turns on the charging relay CHR and controls the charger 50 so that the battery 40 can be charged with electric power from the external power source 90 when the vehicle-side connector 52 is connected to the power source-side connector 92 of the external power source 90 (when the connection signal from the connection switch 54 turns to an ON-signal) while the electric vehicle 20 is parked with the system off at a charging point, such as the driver's home or a charging station. The charging of the battery 40 with electric power from the external power source 90 by the charger 50 as described above is hereinafter referred to as "external charging." Then, when the state of charge SOC of the battery 40 from the main ECU 60 reaches a predetermined percentage Sch (such as 80%, 85% or 90%), the charging ECU 56 ends external charging by stopping driving of the charger 50. After ending the external charging, the charging ECU 56 turns off the charging relay CHR.

In the electric vehicle 20 of the embodiment, when there is a request to air-condition the cabin while the electric vehicle 20 is parked with the system off, the main ECU 60 turns on the system main relay SMR and controls the air conditioner 36 so that the cabin can be air-conditioned. This air conditioning is hereinafter referred to as "preliminary air conditioning."

Figure 2:
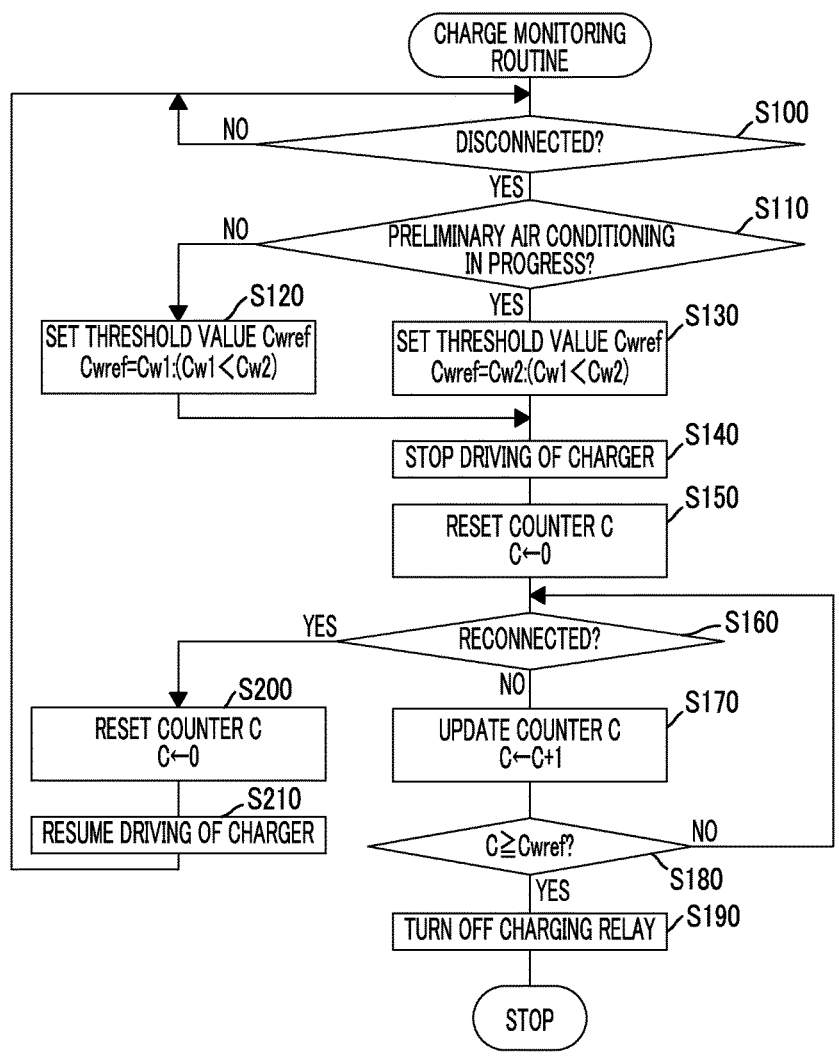
FIG. 2 is an explanatory view that illustrates one example of a charge monitoring routine that is executed by a main ECU of the embodiment.

The operation, in particular, the operation in monitoring external charging, of the electric vehicle 20 of the embodiment constituted as described above is next described. FIG. 2 is an explanatory view that illustrates one example of a charge monitoring routine that is executed by the main ECU 60 of the embodiment. This routine starts to be executed when the charging relay CHR is turned on to start external charging, and its execution is terminated when the charging relay CHR is turned off to end external charging as the state of charge SOC of the battery 40 has reached the predetermined percentage Sch or when the charging relay CHR is turned off as a result of the procedure in step S190, which is described later.

When the charge monitoring routine is executed, the main ECU 60 determines whether the vehicle-side connector 52 has been disconnected from the power source-side connector 92 of the external power source 90 (step S100). This determination can be made by determining whether the connection signal that is input through communication from the connection switch 54 via the charging ECU 56 has turned from an ON-signal to an OFF-signal. If it is determined that the vehicle-side connector 52 has not been disconnected from the power source-side connector 92, then the process is returned to step S100.

If it is determined in step S100 that the vehicle-side connector 52 has been disconnected from the power source-side connector 92, then the main ECU 60 determines whether preliminary air conditioning is in progress (step S110). If it is determined that preliminary air conditioning is not in progress, then the main ECU 60 sets a value Cw1 as a threshold value Cwref, which represents the waiting time from the disconnection of the vehicle-side connector 52 from the power source-side connector 92 to the turn-off of the charging relay CHR (step S120). On the other hand, if it is determined that preliminary air conditioning is in progress, then the main ECU 60 sets a value Cw2, which is greater than the value Cw1, as the threshold value Cwref (step S130). Here, as the value Cw1, a value corresponding to 1 sec, 1.2 sec or 1.5 sec, for example, can be used. As the value Cw2, a value corresponding to 5 sec, 7 sec or 10 sec, for example, can be used.

Then, the main ECU 60 sends a command to stop driving of the charger 50 to the charging ECU 56 to cause the charging ECU 56 to stop driving of the charger 50 (step S140). In this way, external charging is stopped. Then, the main ECU 60 resets the value of a counter C to 0 (step S150), and determines whether the vehicle-side connector 52 has been reconnected to the power source-side connector 92 (step S160). This determination can be made by determining whether the connection signal that is input through communication from the connection switch 54 via the charging ECU 56 has turned from an OFF-signal to an ON-signal.

If it is determined in step S160 that the vehicle-side connector 52 has not been reconnected to the power source-side connector 92, the main ECU 60 updates the counter C by incrementing its value by one (step S170). Then, the main ECU 60 compares the value of the counter C after the update with the threshold value Cwref (step S180), and returns the process to step S150 if it is determined that the value of the counter C is smaller than the threshold value Cwref. The counter C indicates the period of time after the disconnection of the vehicle-side connector 52 from the power source-side connector 92 (after the driving of the charger 50 is stopped).

Then, the procedures in steps S160 to 180 are repeatedly executed. Then, if it is determined in step S180 that the value of the counter C has reached or exceeded the threshold value Cwref, then the main ECU 60 sends a command to turn off the charging relay CHR to the charging ECU 56 to cause the charging ECU 56 to turn off the charging relay CHR (step S190) and then terminates the current routine. In this way, by turning off the charging relay CHR after stopping driving of the charger 50, it is further ensured that no current is flowing through the charging relay CHR when the charging relay CHR is turned off. This prevents the charging relay CHR from getting stuck in an ON state.

If it is determined in step S160 that the vehicle-side connector 52 has been reconnected to the power source-side connector 92 before it is determined in step S180 that the value of the counter C has reached or exceeded the threshold value Cwref, the main ECU 60 resets the value of the counter C to 0 (step S200) and sends a command to resume driving of the charger 50 to the charging ECU 56 to cause the charging ECU 56 to resume driving of the charger 50 (step S210). Then, the main ECU 60 returns the process to step S100. In this way, external charging is restarted.

When the vehicle-side connector 52 is disconnected from the power source-side connector 92 while external charging and preliminary air conditioning are in progress, it is highly likely that the vehicle-side connector 52 will be reconnected to the power source-side connector 92 within a relatively short period of time afterward. Thus, when the vehicle-side connector 52 is disconnected from the power source-side connector 92 while external charging and preliminary air conditioning are in progress, the charging relay CHR is turned off after the value of the counter C has reached or exceeded the value Cw2, which is greater than the value Cw1. This prevents, when the vehicle-side connector 52 is reconnected to the power source-side connector 92 within a relatively short period of time after the vehicle-side connector 52 is disconnected from the power source-side connector 92, the charging relay CHR from being turned off during that time in contrast to a case where the charging relay CHR is turned off when the value of the counter C has reached or exceeded Cw1. As a result, the period from the reconnection of the vehicle-side connector 52 to the power source-side connector 92 to the restart of external charging can be shortened. In addition, because the frequency of turning on and off the charging relay CHR decreases, the charging relay CHR is prevented from suffering from a reduced service life. When the vehicle-side connector 52 is disconnected from the power source-side connector 92 while external charging is in progress but preliminary air conditioning is not, it is highly likely that the electric vehicle 20 will be driven soon afterward. This is the reason why the period from the disconnection of the vehicle-side connector 52 from the power source-side connector 92 to the turn-off of the charging relay CHR is set to be shorter than when preliminary air conditioning is in progress.

Figure 3:
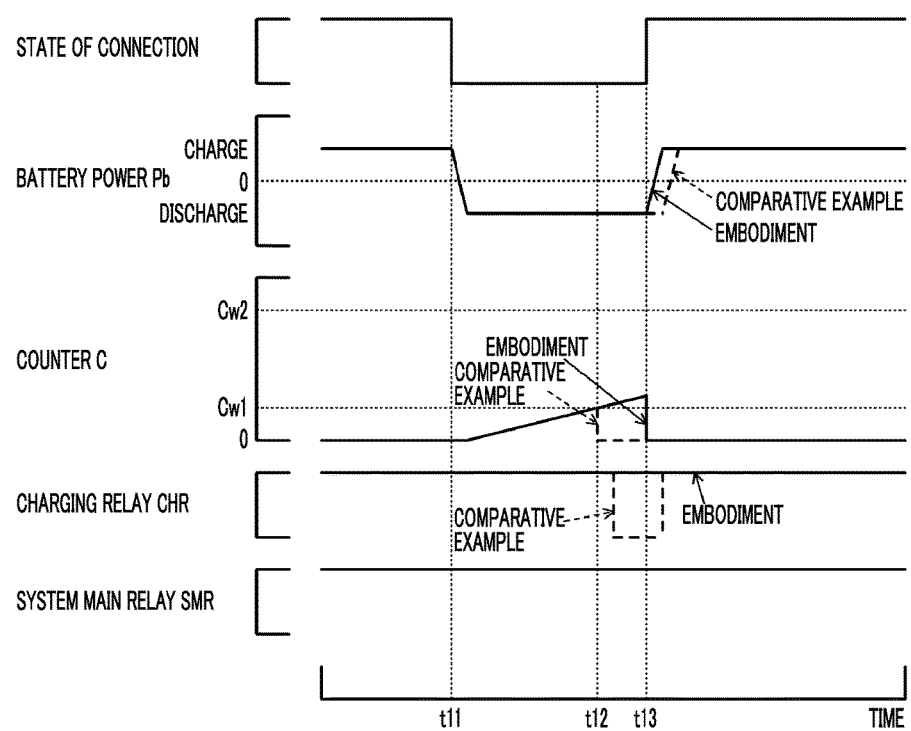
FIG. 3 is an explanatory view that illustrates one example of the changes in the state of connection between a vehicle-side connector and a power source-side connector, the state of external charging, the reading of a counter, the condition of a charging relay and the condition of a system main relay during preliminary air conditioning.

FIG. 3 is an explanatory view that illustrates one example of the changes in the state of connection between the vehicle-side connector 52 and the power source-side connector 92, the state of external charging (the electric power Pb to or from the battery 40), the reading of the counter C, the condition of the charging relay CHR, and the condition of the system main relay SMR during preliminary air conditioning. In the drawing, the solid lines indicate the changes in the embodiment and the broken lines indicate the changes in a comparative example. Here, as the comparative example, a case is considered where the same value Cw1 that is used when preliminary air conditioning is not in progress is also used as the threshold value Cwref when preliminary air conditioning is in progress. In the embodiment and comparative example, when the vehicle-side connector 52 is disconnected from the power source-side connector 92 (at time t11), driving of the charger 50 is stopped to end external charging. Then, the battery 40 is brought into a discharging state because of preliminary air conditioning. Then, in the comparative example, when the value of the counter C reaches the value Cw1 (at time t12), the charging relay CHR is turned off. After that, when the vehicle-side connector 52 is reconnected to the power source-side connector 92 (at time t13), the charging relay CHR is turned on again and then driving of the charger 50 is resumed to restart external charging. In contrast to this, in the embodiment, the charging relay CHR is not turned off (kept on) between the disconnection of the vehicle-side connector 52 from the power source-side connector 92 and their reconnection (between time t11 and time t13). This can shorten the period from the reconnection of the vehicle-side connector 52 to the power source-side connector 92 to the restart of external charging. In addition, because the frequency of turning on and off the charging relay CHR decreases, the charging relay CHR is prevented from suffering from a reduced service life.

In the electric vehicle 20 of the embodiment that is described above, when the vehicle-side connector 52 is disconnected from the power source-side connector 92 while external charging is in progress, a value Cw1 is set as a threshold value Cwref if preliminary air conditioning is not in progress and a value Cw2, which is greater than the value Cw1, is set as the threshold value Cwref if preliminary air conditioning is in progress. Then, when the value of the counter C has reached or exceeded the threshold value Cwref, the charging relay CHR is turned off. In other words, the period from the disconnection of the vehicle-side connector 52 from the power source-side connector 92 to the turn-off of the charging relay CHR is set to be longer when preliminary air conditioning is in progress than when preliminary air conditioning is not in progress. This prevents, when the vehicle-side connector 52 is reconnected to the power source-side connector 92 within a relatively short period of time after the vehicle-side connector 52 is disconnected from the power source-side connector 92 while external charging and preliminary air conditioning are in progress, the charging relay CHR from being turned off during that time. As a result, the period from the reconnection of the vehicle-side connector 52 to the power source-side connector 92 to the restart of external charging can be shortened. In addition, because the frequency of turning on and off the charging relay CHR decreases, the charging relay CHR is prevented from suffering from a reduced service life.

Figure 4:
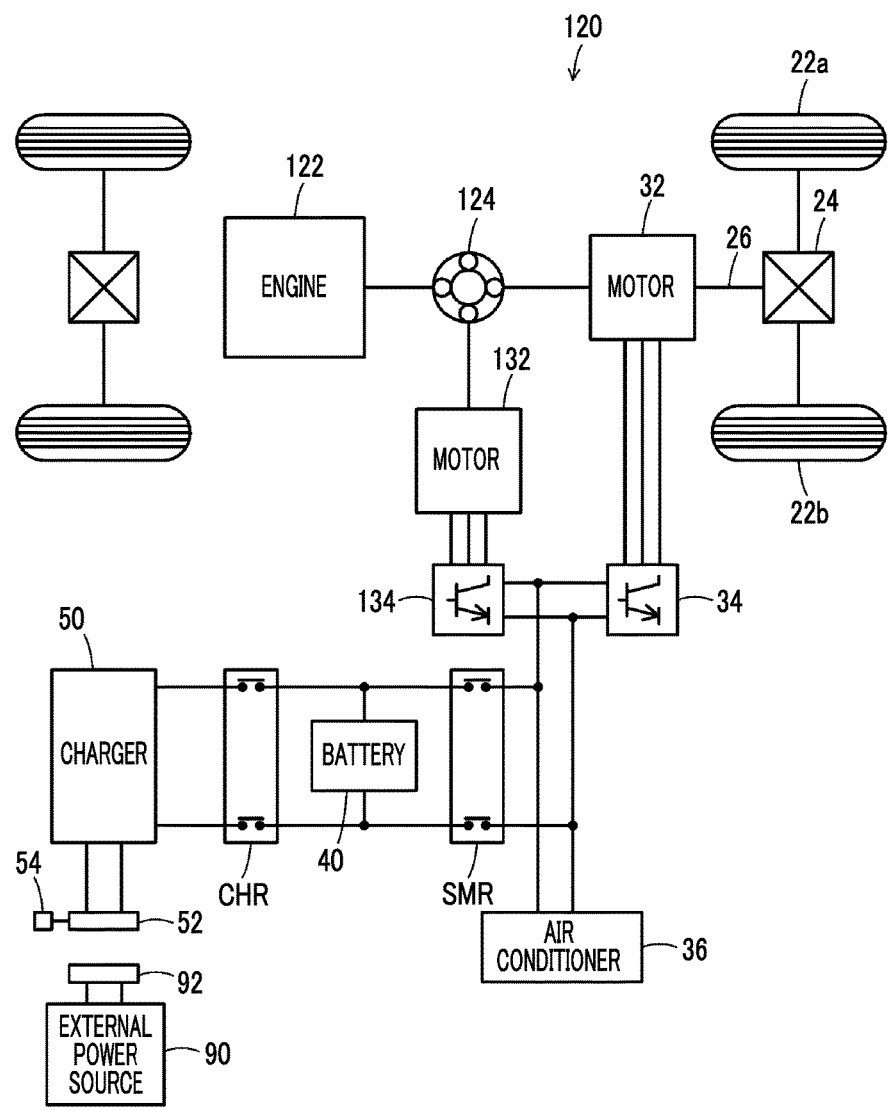
FIG. 4 is a configuration diagram that illustrates the general configuration of a hybrid vehicle as a modification.

The electric vehicle 20 of the embodiment includes the motor 32, the inverter 34 and the battery 40 and is configured to be capable of external charging in which the battery 40 is charged with electric power from the external power source 90. However, as shown in FIG. 4, a hybrid vehicle 120 as a modification may include an engine 122, a planetary gear 124, a motor 132 and an inverter 134 in addition to the motor 32, the inverter 34 and the battery 40, and may be configured to be capable of external charging. Here, the planetary gear 124 has a sun gear to which the motor 132 is connected, a carrier to which the engine 122 is connected and a ring gear to which the drive shaft 26 and the motor 32 are connected. The inverter 34, which is used to drive the motor 132, is connected to the power line 44 together with the inverter 34.

The correspondence relationship with the primary elements that are described in the section of SUMMARY is described. In the embodiment, the motor 32 is one example of the "motor," the battery 40 is one example of the "battery," the air conditioner 36 is one example of the "air conditioner," the charging relay CHR is one example of the "charging relay," and the main ECU 60 and the charging ECU 56 are one example of the "electronic control unit."

The correspondence relationship between the primary elements of the embodiment and the primary elements of the present disclosure that are described in the section of SUMMARY does not limit the elements of the present disclosure that are described in the section of SUMMARY because the embodiment is one example that is used to describe a mode for carrying out the present disclosure that is described in the section of SUMMARY in detail. In other words, the interpretation of the present disclosure that is described in the section of SUMMARY should be made based on the description in the section, and the embodiment is merely one specific example of the present disclosure that is described in the section of SUMMARY.

A mode for carrying out the present disclosure is described with reference to an embodiment in the foregoing, it is needless to say that the present disclosure is not limited to the embodiment at all and may be implemented in various forms without departing from the gist of the present disclosure.

The present disclosure is applicable in the automobile production industry.

What is claimed is:

1. An automobile comprising:
   a motor configured to drive the automobile;
   a battery connected to the motor via a power line;
   an air conditioner connected to the power line, the air conditioner being configured to air-condition a cabin;
   a charger connected to the power line, the charger being capable of charging the battery with electric power from an external power source when the charger is connected to the external power source;
   a charging relay provided on the power line, the charging relay being configured to connect and disconnect the motor, the battery and the air conditioner to and from the charger when the charging relay is turned on and off; and
   an electronic control unit configured to:
   i) turn off the charging relay when the charger is disconnected from the external power source while external charging is in progress which is started when the charger is connected to the external power source and the charging relay is turned on while a system is off and in which the battery is charged with electric power from the external power source by the charger, and ii) set a period from the disconnection of the charger from the external power source to a turn-off of the charging relay to be longer when preliminary air conditioning is in progress than when preliminary air conditioning is not in progress, the preliminary air conditioning being air conditioning in the cabin that is carried out by the air conditioner while the system is off.

2. The automobile according to claim 1, wherein the electronic control unit is configured to turn off the charging relay after stopping driving of the charger when the charger is disconnected from the external power source while the external charging is in progress.

3. A control method for an automobile, the automobile comprising:

a motor configured to drive the automobile;
a battery connected to the motor via a power line;
an air conditioner connected to the power line, the air conditioner being configured to air-condition a cabin;
a charger connected to the power line, the charger being capable of charging the battery with electric power from an external power source when the charger is connected to the external power source;
a charging relay provided on the power line, the charging relay being configured to connect and disconnect the motor, the battery and the air conditioner to and from the charger when the charging relay is turned on and off; and
an electronic control unit, the control method comprising:

i) turning off the charging relay by the electronic control unit when the charger is disconnected from the external power source while external charging is in progress which is started when the charger is connected to the external power source and the charging relay is turned on while a system is off and in which the battery is charged with electric power from the external power source by the charger, and ii) setting, by the electronic control unit, a period from the disconnection of the charger from the external power source to a turn-off of the charging relay to be longer when preliminary air conditioning is in progress than when preliminary air conditioning is not in progress, the preliminary air conditioning being air conditioning in the cabin that is carried out by the air conditioner while the system is off.

* * * * *